Patented Apr. 13, 1926.                                    1,580,650

UNITED STATES PATENT OFFICE.

DIRK COSTER, OF HAARLEM, NETHERLANDS, AND GEORG von HEVESY, OF COPENHAGEN, DENMARK, ASSIGNORS TO NAAMLOOZE VENNOOTSCHAP PHILIPS' GLOEILAMPEN-FABRIEKEN.

PROCESS OF SEPARATING HAFNIUM AND ZIRCONIUM.

No Drawing.        Application filed March 13, 1924.   Serial No. 699,144.

*To all whom it may concern:*

Be it known that we, DIRK COSTER, a subject of the Queen of the Netherlands, residing at Haarlem, in the Province of North Holland, Kingdom of the Netherlands, and GEORG VON HEVESY, a subject of the Hungarian Kingdom, residing at Copenhagen, in the Kingdom of Denmark, have invented certain new and useful Improvements in or Relating to Processes of Separating Hafnium and Zirconium, of which the following is a specification.

The invention relates to the separation of the element the atomic number of which is 72 named "hafnium" and zirconium, such elements being frequently found side by side in minerals and having chemical properties which strongly resemble each other.

According to the invention the separation is brought about by progressive fractional separation by taking advantage of the difference in basicity of hafnium and zirconium oxide, it having been recognized that hafnium oxide is more basic than zirconium oxide. The latter property may be utilized by adding a base, or a salt that by hydrolysis or decomposition acts as a base, in such a proportion to a solution of a mixture of hafnium salts and zirconium salts that the metals are partially precipitated in the form of hydroxides. The precipitate produced contains proportionally less hafnium and more zirconium than the primary mixture.

In addition a solution of an acid can be added to a mixture of hafnium hydroxide and zirconium hydroxide or the corresponding oxides in such a proportion that part of the metals are brought into solution in the form of salts. The solution obtained will be proportionally richer in hafnium than the original mixture.

According to the invention the two aforesaid processes can also be combined.

For all three processes it is of great importance that the solution of salts or the mixture of hydroxides or oxides should be free of admixtures of other metals such as titanium, niobium, tantalum, aluminium, iron and the like. If the latter metals are present in the mixture as additions to hafnium and zirconium the aforesaid processes present great difficulty as the said metals also are mutually different in basicity. It is therefore advisable that any admixtures thereof should be removed beforehand, which may be done in any known manner, for example in any suitable manner known for removing such admixtures from compounds of zirconium.

For the sake of clearness the three processes embodying the invention will be described more fully hereinafter.

When carrying out the first process, the insoluble mineral is converted into a mixture of soluble salts, for example by fusing with a suitable medium such as potassium bifluoride the zirconium and hafnium can be converted into soluble double fluorides. The ore can also be fused with potassium bisulphate, the zirconium and the hafnium being thus converted into soluble sulphates.

After removing from the mixture, in some suitable manner, any impurity caused by the presence of other metals, either a base such as aqua-ammonia or sodium-hydroxide, or a basically reacting salt such as sodium acetate, or salt that by decomposition acts as a base such as sodium-thiosulphate, is added to the solution in such a proportion that part of the metals present is precipitated as a mixture of the hydroxides. The hafnium, the oxide of which is more basic is thus concentrated in the solution whereas the precipitate contains proportionally less hafnium than the primary mixture. The precipitate of hydroxides is separated by filtering and converted afresh into a soluble mixture of salts, whereupon a base or a corresponding compound is added again to the solution. This operation is repeated until the separation has proceeded as far as desired.

On the other hand, a base, or a correspondingly reacting compound, may again be added to the mother lye so that the metals are again partially precipitated. Thus the content of hafnium of the mother lye can be continually increased. From the mother lye which is finally obtained and which contains a small percentage of zirconium or no zirconium at all the hydroxid of hafnium may be precipitated by adding an excess of a base or a corresponding compound or by hydrolyzing by treatment with superheated steam. By heating the hydroxid to a suitable temperature the same is converted into the oxide and by reducing the same in any suitable manner for example in a manner known for reducing zirconiumoxide the metal hafnium is obtained either in a pure state or admixed with a small percentage of zirconium.

It may be mentioned, by way of example, that when starting from a pure mixture of soluble salts of hafnium and zirconium such as can be obtained directly from some mineral so that the said mixture contains for example 5% of hafnium, the zirconium can be wholly precipitated by 12 successive treatments with NaOH, and the precipitates of the hydroxides which are thus produced are at every time converted into the soluble mixture of salts. By comparing the said precipitates it is found that the fourth precipitate is about half as rich in hafnium as the primary mixture, whereas the eighth precipitate contains only about a fourth part of the original content of hafnium.

According to the second process a mixture of the hydroxides or oxides is started from. The oxide can be obtained from the hydroxide by heating. From the zirconium-mineral containing hafnium a pure soluble mixture of salts can be prepared in the manner before described. From the solution of the said mixture, a mixture of the hydroxides is prepared, either by precipitating all hafnium and zirconium by adding an excess of base or by hydrolyzing the salts by treatment with superheated steam. To the precipitate of the hydroxides which is thus produced, a quantity of acid is added which is insufficient to dissolve the hydroxides entirely. The solution will consequently contain comparatively more hafnium than the primary mixture. So far example, a little hydrochloric acid may be added to the mixture of the hydroxides. In this case the partial solution of the oxychlorides will contain proportionally more hafnium than the original mixture. The residue may be acid-treated again, so that still more and more hafnium is removed.

On the other hand an excess of base may be added again to the solution so that a mixture of zirconium hydroxides and hafnium hydroxides is produced, which however is richer in hafnium than the primary mixture. Said mixture can be acid-treated again so that the hafnium is again concentrated in the solution and by proceeding in the same manner the concentration desired can be obtained.

The solution finally obtained which contains a high percentage of hafnium may be treated in the manner already described in order to obtain metallic hafnium or an alloy of hafnium and zirconium containing a high percentage of hafnium.

Very good results are also obtained by means of the third process which is a combination of the two processes first described.

First a pure solution of salts of hafnium and zirconium can be prepared for example from a zirconium mineral containing hafnium. To the said solution a base or a correspondingly reacting compound is added so that a mixture of the hydroxides is partially precipitated.

To the mother lye which contains proportionally more hafnium than the primary mixture an excess of base is added so that the metals are entirely precipitated as hydroxides. The mixture of hydroxides obtained is then acid-treated so that the metals are partially brought into solution. The residue of hydroxides is separated by filtering and the mother lye which again is richer in hafnium than the mixture of hydroxides is treated again with a base or a corresponding compound; this operation is continued until the desired concentration of hafnium has been realized.

A mixture containing a high content of zirconium can be produced in a corresponding manner and zirconium-hydroxide will be obtained by the continuation of the process. From the hydroxide metallic zirconium or the desired compounds of zirconium may be obtained in any known manner.

The hafnium-compound obtained which contains only a small percentage of zirconium or no zirconium at all may be converted into hafnium-oxide or metallic hafnium in the manner already described. Other compounds of hafnium may equally be obtained applying the methods known for zirconium.

In the claims, by the term "base" it is intended to cover such precipitating reagents as aqua-ammonia, or sodium hydroxide, or a basically reacting salt such as sodium acetate, or a salt that by decomposition acts as a base such as sodium-thiosulphate. Also by the term "hydroxide" it is intended to cover the "oxide".

What we claim is:—

1. The method of separating hafnium and zirconium, which comprises progressively fractionally separating one of the elements as hydroxide, and collecting the separated fractions.

2. The method of separating hafnium and zirconium, which comprises adding to a solution containing the same a precipitating base, and progressively fractionally separating the elements as hydroxides.

3. The method of separating hafnium and zirconium, which comprises adding to a mass containing basic compounds of the same a reagent of acid character in sufficient quantity to change the ratio of the said elements contained in the converted and in the non-converted compounds of the same with respect to the ratio of said elements in the original mass.

4. The method of separating hafnium and zirconium, which comprises adding to a mass containing basic compounds of the same an acid in sufficient quantity to change the ratio of said elements in the converted and in the nonconverted compounds with respect to the ratio of said elements in the original mass.

5. The method of separating hafnium and zirconium, which comprises adding to a mass containing hydroxides of the same an acid in sufficient quantity to convert a part of said hydroxides into salts, the ratio of said elements in the solution of salts differing from the ratio of said elements in the original mixture.

6. The method of separating hafnium and zirconium, which comprises adding to a solution containing the same a precipitating base separating the elements as hydroxides, and in then adding to said hydroxides a reagent in sufficient quantity to change the ratio of the said elements contained in the converted and in the nonconverted compounds of the same with respect to the ratio of said elements in said hydroxides.

7. The method of separating hafnium and zirconium, which comprises adding to a solution containing the same a precipitating base separating the elements as hydroxides, and in then adding to said hydroxides an acid in sufficient quantity to change the ratio of said elements in the converted and in the nonconverted compounds of the same with respect to the ratio of said elements in said hydroxides.

8. The method of separating hafnium and zirconium, which comprises adding to a solution containing the same a precipitating base fractionally separating the elements as hydroxides adding an excess of base to the mother liquor, and adding to the precipitated mass obtained a reagent in sufficient quantity to change the ratio of converted and nonconverted compounds of the same with respect to the ratio of said elements in said hydroxides.

9. The method of separating hafnium and zirconium, which comprises adding to a solution containing the same a precipitating base and fractionally separating the elements as hydroxides, adding an excess of base to the mother liquor and adding to the precipitated mass obtained an acid in sufficient quantity to change the ratio of said elements in the converted and in the nonconverted compounds with respect to the ratio of said elements in said mass.

10. The method of separating hafnium and zirconium, from minerals containing the same, which comprises converting the minerals into soluble salts, purifying the solution of the salts, and adding to the purified solution a precipitating base, and progressively fractionally separating the elements as basic compounds.

11. The method of separating hafnium and zirconium, from minerals containing the same, which comprises converting the minerals into soluble salts, purifying the solution of the salts, and adding to the purified solution a precipitating base, and progressively fractionally separating the elements as hydroxides.

12. The method of separating hafnium and zirconium from minerals containing the same, which comprises converting the minerals into soluble salts, purifying the solution of the salts, converting the purified solution into basic compounds of said elements and adding to the mass an acid in sufficient quantity to change the ratio of said elements in the converted and in the nonconverted compounds with respect to the ratio of said elements in the original mass.

13. The method of separating hafnium and zirconium from minerals containing the same, which comprises converting the minerals into soluble salts, purifying the solution of the salts and adding to the purified solution a precipitating base, separating the elements as hydroxides and in then adding to said hydroxides a reagent in sufficient quantity to change the ratio of said elements contained in the converted and in the nonconverted compounds of the same with respect to the ratio of said elements in said hydroxides.

14. The method of separating hafnium and zirconium from minerals containing the same, which comprises converting the minerals into soluble salts, purifying the solution of the salts and adding to the purified solution a precipitating base, fractionally separating the elements as hydroxides, adding an excess of base to the mother liquor, and adding to the precipitated mass obtained a reagent in sufficient quantity to change the ratio of said elements contained in the converted and in the nonconverted compounds of the same, with respect to the ratio of said elements in said mass.

15. The method of preparing metallic hafnium containing a high percentage of hafnium which comprises adding to a solution containing hafnium and zirconium a precipitating base, progressively fractionally separating said elements as hydroxides and converting the mixture of compounds containing a high percentage of hafnium finally obtained into the oxides of said elements and reducing the same to the metallic state.

16. The method of preparing metallic hafnium containing a high percentage of hafnium, which comprises, adding to the mass containing basic compounds of hafnium and zirconium a reagent in sufficient quantity to change the ratio of said elements contained in the converted and in the nonconverted compounds of the same with respect to the ratio of said elements in the original mass, and converting the mixture of compounds containing a high percentage of hafnium finally obtained into oxides of said elements and reducing the same to the metallic state.

17. The method of preparing metallic hafnium containing a high percentage of hafnium, which comprises adding to a solution containing hafnium and zirconium a precipitating base separating the elements as hydroxides, and in then adding to said hyrdoxides a reagent in sufficient quantity to change the ratio of said elements contained in the converted and in the nonconverted compounds of the same with respect to the ratio of said element in said hydroxides, converting the mixture of compounds containing a high percentage of hafnium finally obtained into the oxides of said elements and reducing the same to the metallic state.

18. The method of preparing metallic hafnium containing a high percentage of hafnium which comprises adding to a solution containing hafnium and zirconium a precipitating base fractionally separating the elements as hydroxides, adding an excess of base to the mother liquor and adding to the precipitated mass obtained a reagent in sufficient quantity to change the ratio of said elements contained in the converted and in the nonconverted compounds of the same with respect to the ratio of said elements in the original mass, and converting the mixture of compounds finally obtained into oxides of said elements and reducing the same to the metallic state.

19. The method of preparing metallic hafnium containing a high percentage of hafnium from minerals containing hafnium and zirconium which comprises converting the minerals into soluble salts, purifying the solution of the salts, and adding to the purified solution a precipitating base, progressively fractionally separting the elements as hydroxides, and converting the mixture of compounds containing a high percentage of hafnium finally obtained into the oxides of said elements and reducing the same to the metallic state.

20. The method of preparing metallic hafnium from minerals containing hafnium and zirconium, which comprises converting the minerals into soluble salts, purifying the solution of the salts, converting the purified solution into basic compounds of said elements and adding to the mass a reagent in sufficient quantity to change the ratio of said elements contained in the converted and in the nonconverted compounds of the same, with respect to the ratio of said elements in said mass, and converting the mixture of compounds containing a high percentage of hafnium finally obtained into the oxides of said elements and reducing the same to the metallic state.

21. The method of separting metallic hafnium from minerals containing hafnium and zirconium which comprises converting the minerals into soluble salts, purifying the solution of the salts and adding to the purified solution a precipitating base, separating the elements as hydroxides and in then adding to said hydroxides a reagent in sufficient quantity to change the ratio of said elements contained in the converted and in the nonconverted compounds of the same with respect to the ratio of said elements in said hydroxides and converting the mixture of compounds containing a high percentage of hafnium finally obtained into the oxides of said elements and reducing the same to the metallic state.

22. The method of preparing metallic hafnium from minerals containing hafnium and zirconium which comprises converting the minerals into soluble salts, purifying the solution of the salts and adding to the purified solution a precipitating base, fractionally separating the elements as hydroxides, adding an excess of base to the mother liquor and adding to the precipitated mass obtained a reagent in sufficient quantity to change the ratio of said elements contained in the converted and in the nonconverted compounds of the same, with respect to the ratio of said elements in said mass, and converting the mixture of compounds finally obtained into the oxids of said elements and reducing the same to the metallic state.

In testimony whereof we affix our signatures, at the city of The Hague, this 12th day of January, 1924, at the city of Copenhagen, this 24th day of January, 1924.

DIRK COSTER.
GEORG von HEVESY.